United States Patent
Furushige et al.

(10) Patent No.: US 9,924,061 B2
(45) Date of Patent: Mar. 20, 2018

(54) IMAGE FORMING APPARATUS, METHOD AND RECORDING MEDIUM THAT EXECUTE STANDARD APPLICATION TO CONTROL HARDWARE RESOURCES

(71) Applicant: KYOCERA Document Solutions Inc., Osaka (JP)

(72) Inventors: Katsuji Furushige, Osaka (JP); Tomonori Naota, Osaka (JP); Tomihito Doi, Osaka (JP); Makoto Kowaka, Osaka (JP); Takashi Murakami, Osaka (JP); Kyota Mitsuyama, Osaka (JP); Ayaka Ikejima, Osaka (JP); Yosuke Nakazato, Osaka (JP); Masato Hirota, Osaka (JP); Kentaro Okamoto, Osaka (JP); Daijiro Kitamoto, Osaka (JP); Koji Ikawa, Osaka (JP); Satoshi Imai, Osaka (JP); Minoru Takahashi, Osaka (JP); Wataru Tsukuda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 107 days.

(21) Appl. No.: 14/794,726

(22) Filed: Jul. 8, 2015

(65) Prior Publication Data
US 2016/0014292 A1   Jan. 14, 2016

(30) Foreign Application Priority Data
Jul. 8, 2014 (JP) ................................ 2014-140644

(51) Int. Cl.
*G03G 21/14* (2006.01)
*G06F 9/54* (2006.01)
(Continued)

(52) U.S. Cl.
CPC ........... *H04N 1/00941* (2013.01); *G06F 8/61* (2013.01); *H04N 1/00938* (2013.01); *H04N 2201/0094* (2013.01)

(58) Field of Classification Search
CPC .......... H04N 1/00938; H04N 1/00941; H04N 1/00949
See application file for complete search history.

(56) References Cited

U.S. PATENT DOCUMENTS

2003/0044185 A1   3/2003   Kawaura
2008/0059960 A1*  3/2008   Akiyoshi .............. G06F 9/4406
                                                     717/170
(Continued)

FOREIGN PATENT DOCUMENTS

| EP | 1385089 | 1/2004 |
|----|---------|--------|
| JP | 2002-084383 A | 3/2002 |
| JP | 2003-182191 A | 7/2003 |

*Primary Examiner* — Benny Q Tieu
*Assistant Examiner* — Haris Sabah
(74) *Attorney, Agent, or Firm* — Hawaii Patent Services; Nathaniel K. Fedde; Kenton N. Fedde

(57) ABSTRACT

Provided is an image forming apparatus having a control circuit. The control circuit includes a standard application execution circuit, an apparatus control platform, and a standard application control circuit. The standard application execution circuit has the standard application execution service that executes a standard application. The apparatus control platform includes control service, apparatus control execution service, and an apparatus control management service. The control service controls hardware on an operating system. The apparatus control execution service executes the control service with an interface that is an executing procedure of the control service. The apparatus control management service instructs a call of the control service to the apparatus control execution service. The standard application control circuit manages a state of the (Continued)

standard application and provides an interface for using the hardware resources of the standard application execution service.

6 Claims, 3 Drawing Sheets

(51) Int. Cl.
*H04N 1/00* (2006.01)
*G06F 9/445* (2018.01)

(56) References Cited

U.S. PATENT DOCUMENTS

| | | | |
|---|---|---|---|
| 2010/0214588 A1* | 8/2010 | Nakahara | G06F 3/1204 |
| | | | 358/1.13 |
| 2011/0051183 A1 | 3/2011 | Kanemitsu | |
| 2011/0145843 A1 | 6/2011 | Ohhashi et al. | |
| 2013/0347098 A1* | 12/2013 | Maeda | G06F 21/31 |
| | | | 726/17 |

* cited by examiner

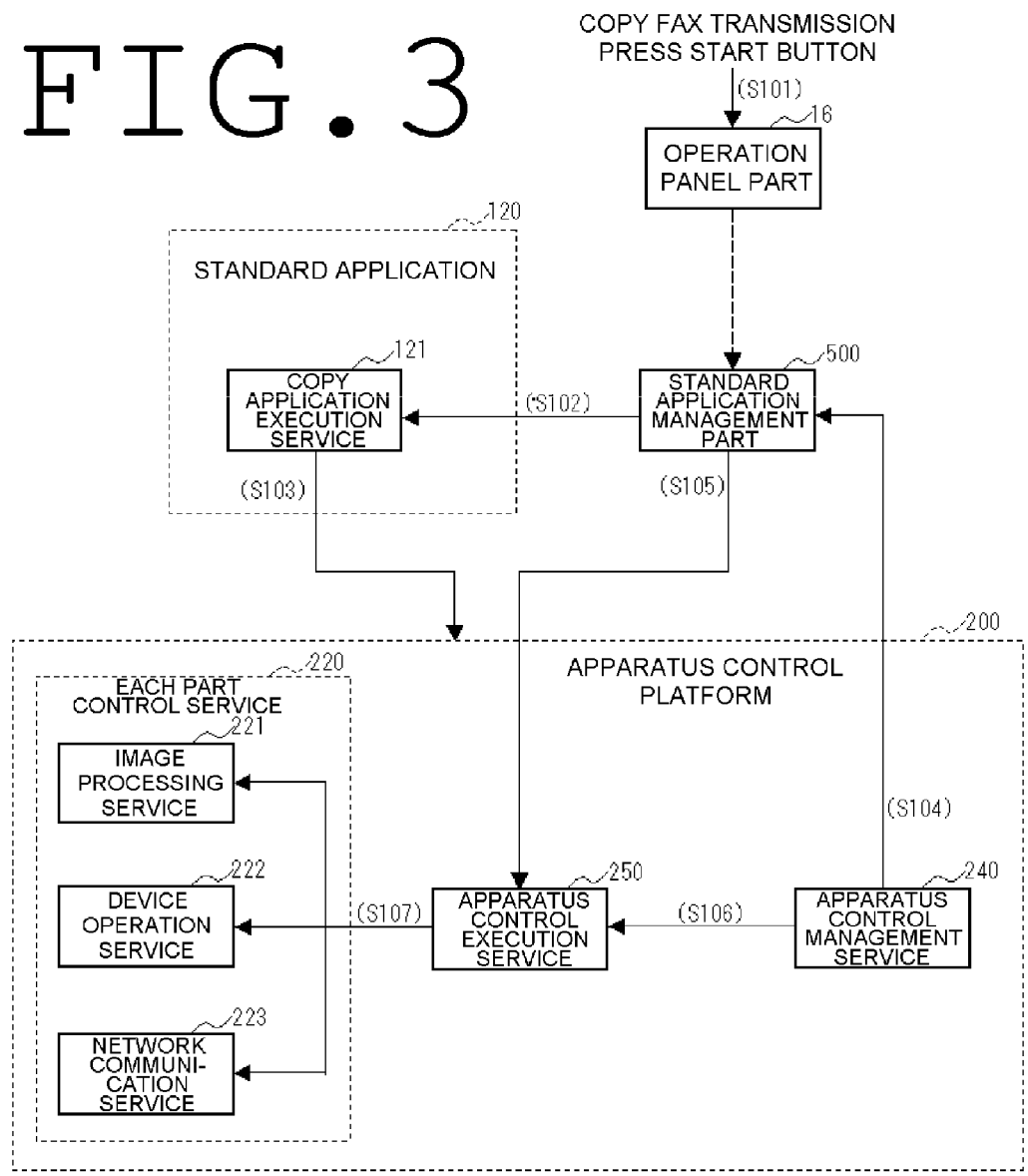

IMAGE FORMING APPARATUS, METHOD AND RECORDING MEDIUM THAT EXECUTE STANDARD APPLICATION TO CONTROL HARDWARE RESOURCES

INCORPORATION BY REFERENCE

This application is based on and claims the benefit of priority from Japanese Patent Application No. 2014-140644 filed on Jul. 8, 2014, the contents of that are hereby incorporated by reference.

BACKGROUND

The present disclosure is related with an image forming apparatus, image forming method, and a recording medium, and especially applied the image forming apparatus, the image forming method, and the recording medium for adding function by an application.

There is an image forming apparatus that can print a document and an image, such as an MFP (Multi Functional Peripheral, MFP) and a printer. Some image forming apparatuses can install and execute various applications (application software). There are applications, such as PDF generation, card management, and book management. Also, there is an application for cooperating with another apparatus, such as a camera.

Incidentally, in order to install and execute such applications, it is necessary to develop each application so that fundamental function of OS (Operating System) equipped in the image processing device can be used. Also, development of application is needed to carry out efficiently for lowering development cost.

A typical case that cancels such a problem is disclosed. In this case, two or more applications that can carry out a unique process for each user service, such as a printer, a copy, or a facsimile, are equipped. Also, a platform that performs management of hardware resources, execution control, and image formation processing, is provided. This platform is required in common for, at least two of applications. Thus, the platform intervenes between the application and the hardware resources. An application registration management module arranged on this platform manages the application. Therefore, when a user makes the application for each user service, sections other than a platform are made. Also, the application administrative module arranged on the platform is changed. Thereby, the burden of application making is reduced.

SUMMARY

An image forming apparatus according to an embodiment of the present disclosure includes a control circuit. The control circuit includes a standard application execution circuit that has a standard application execution service for executing a standard application, control service that controls hardware on an operating system, apparatus control execution service that executes the control service with an interface as an executing procedure of the control service, an apparatus control platform that has an apparatus control management service for instructing a call of the control service to the apparatus control execution service, and a standard application control circuit that provides an interface for managing a state of the standard application and for using hardware resources of the standard application execution service.

An image forming method according to an embodiment of the present disclosure is executed by an image forming apparatus having hardware resources. The image forming method includes: executing, via a standard application execution service provided by a standard application execution circuit, a standard application; controlling, via a control service provided by a control circuit, hardware on an operating system; executing, via an apparatus control execution service provided by the control circuit, the control service with an interface as an executing procedure of the control service; instructing, via an apparatus control management service provided by an apparatus control platform in the control circuit, a call of the control service to the apparatus control execution service; and providing, via a standard application control circuit, an interface for managing a state of the standard application and for using hardware resources of the standard application execution service.

A non-transitory computer readable recording medium according to an embodiment of the present disclosure stores a control program executable by a computer for controlling an image forming apparatus. The control program includes a first program code causing the computer to execute a standard application, a second program code causing the computer to control hardware on an operating system, a third program code causing the computer to execute the second program code with an interface as an executing procedure of the second program code, a fourth program code causing the computer to instruct a call of the second program code to the third program code, and a fifth program code causing the computer to provide an interface for managing a state of the standard application and for using hardware resources of the first program code.

BRIEF DESCRIPTION OF THE DRAWINGS

FIG. 3 illustrates steps that execute copy FAX transmission function of the image forming apparatus as shown in FIG. 1.

DETAILED DESCRIPTION

Embodiment

A System Configuration of Image Forming Apparatus 1

Figure 1:
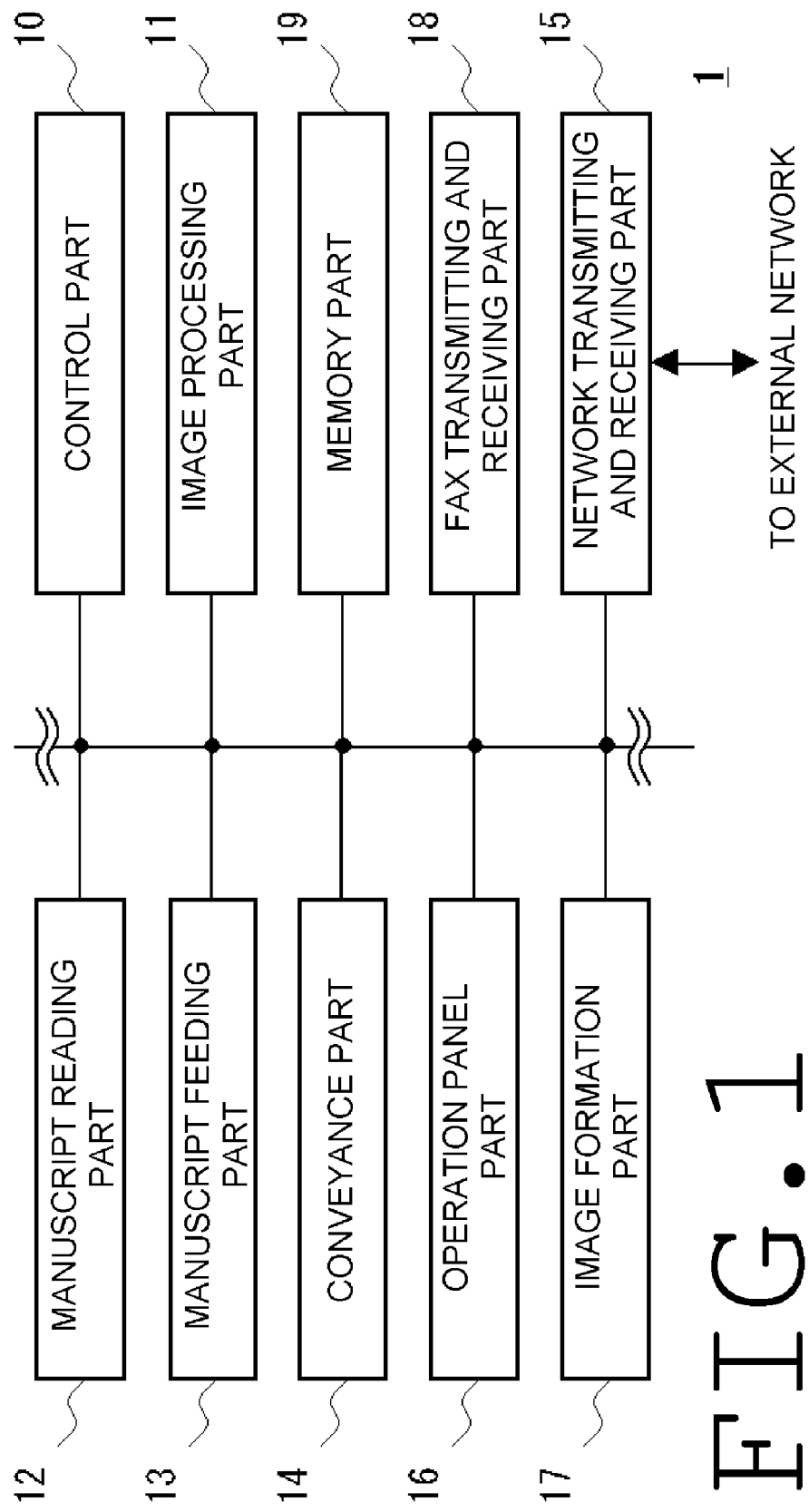
FIG. 1 illustrates a system configuration of the image forming apparatus according to the present embodiment.

Then, referring to FIG. 1, a system configuration of image forming apparatus 1 is described. In the following explanation, an "application" is an application software. According to the image forming apparatus, image forming method, and image forming program of the present disclosure, a module is arranged to an extended application platform. The module is unity of function that manages the application for extending function (henceforth an "extended application.")

Also, a module that controls hardware (henceforth "apparatus control"), a module that executes apparatus control, and a module that performs management of apparatus control are arranged in an apparatus control platform. Also, a standard application control circuit, which is a module for managing a standard application that provides service for the extended application, is provided. Thus, by providing the standard application control circuit, when adding or erasing the standard application, it can avoid changing the module of the extended application platform and the apparatus control platform. As for image forming apparatus 1, image processing part 11, manuscript reading part 12, manuscript feeding part 13, conveyance part 14, network transmitting and receiving part 15, operation panel part 16, image formation part 17, Fax transmitting and receiving part 18, and the memory part 19, or the like, are connected to control part 10. Each part is operation-controlled by control part 10.

Control part 10 is an information processing circuit. Control part 10 reads a control program memorized in a recording medium of memory part 19, and it expands and executes the control program. Thereby, each part is operated as a functional block as described later. Also, control part 10 controls a whole device according to instructions information input from an external terminal or operation panel part 16.

Image processing part 11 is a control arithmetic circuit. Image processing part 11 executes specific image processing to various kinds of image data. Image processing part 11 performs various image processing, such as scaling, density control, gradation adjustment, and an image improvement, for example. Image processing part 11 memorizes the image read by manuscript reading part 12 as print data in memory part 19. In this case, image processing part 11 can also convert the print data into the file unit as a format in PDF, TIFF, or the like.

Manuscript reading part 12 is a circuit that reads manuscript, which is set. Manuscript feeding part 13 is a mechanism in which the manuscript read by manuscript reading part 12 is conveyed. Conveyance part 14 is a mechanism that conveys a recording paper from a sheet paper cassette, performs image formation by image formation part 17, and conveys to a stack tray after that. Image formation part 17 is a circuit, which makes perform the image formation to a recording paper by using data memorized in memory part 19, read by manuscript reading part 12, or acquired from the external terminal by output instruction by a user.

Network transmitting and receiving part 15 is a network connection circuit for connecting with an external network. Network transmitting and receiving part 15 transmits and receives data in a data communication line and transmits and receives a sound signal in a voice telephone line. Network transmitting and receiving part 15 may be connected to an external terminal, a server, or the like, via the network.

Operation panel part 16 is a circuit having a display part and an input part. The display part is LCD panel, or the like. The input part has a button of switching operational mode, a numeric keypad, a start button, a touch panel, or the like. The operational mode includes photo copy, FAX transmission, scan, or the like. The start button acquires an instruction according to execution of a job. The job is related with print, transmission, memory, record, or the like, for the selected document. Operation panel part 16 acquires a user instruction. The user instruction includes installation and the instructions of use for extended application 400 (FIG. 2) (application software, application) which is described later. Also, it is also possible to input and change each of user information by a user instruction. Therefore, operation panel part 16 may be provided with a control part and recording medium for exclusive use, may cooperate with control part 10, and may control GUI (Graphical User Interface.)

The details of control of operation panel part 16 at the time of installation or use for extended application 400 are described later. Also, operation panel part 16 may be equipped with a connecting part that connects with a recording medium or an external apparatus having a recording medium.

Fax transmitting and receiving parts 18 is a circuit, such as a FAX board, which transmits and receives a facsimile. Fax transmitting and receiving part 18 renders image data read by manuscript reading part 12, a file received from network transmitting and receiving part 15, or the like, and performs facsimile transmission. Also, Fax transmitting and receiving part 18 makes image formation of image data by image formation part 17. The image data is memorized in memory part 19 or is performed facsimile reception. Also, Fax transmitting and receiving part 18 transmits the image data to an external terminal by using network transmitting and receiving part 15.

Memory part 19 is a circuit including a non-transitory recording medium and its controller. The control program and data for operation-controlling image forming apparatus 1 are memorized in the recording medium of memory part 19. These control program and data may be provided as a firmware like form. Also, these control program and data are expanded in execution time and are executed by control part 10. Also, memory part 19 may memorize various job data, image data scanned by manuscript reading part 12, image data performed image processing by image processing part 11, files, such as a print document transmitted from another terminal, various files read from the connected recording medium, data for thumbnail images, or the like. Also, memory part 19 may memorize an account setup for a user. Also, in memory part 19, an area of a document box for each user may be included.

In addition, in image forming apparatus 1, control part 10 and image processing part 11 may integrally form as like CPU with built-in GPU, a chip-on module package, or the like. Also, control part 10 and image processing part 11 may have a recording medium.

Figure 2:
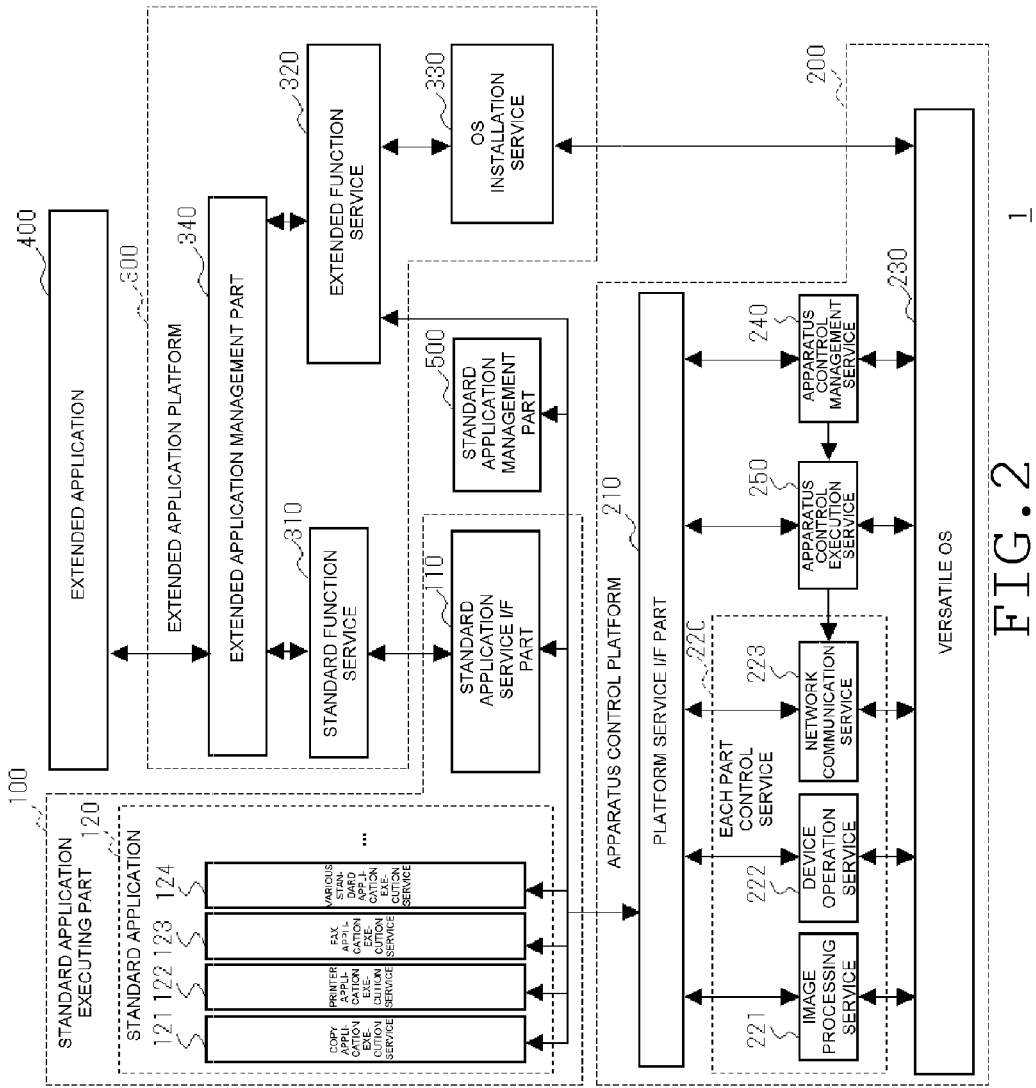
FIG. 2 illustrates a control configuration of the image forming apparatus as shown in FIG. 1.

[The Control Configuration of Image Forming Apparatus 1] Then, referring to FIG. 2, the control configuration of image forming apparatus 1 is described. Image forming apparatus 1 includes standard application executing part 100 (standard application execution circuit), apparatus control platform 200, and extended application platform 300 as three hierarchical block structures. Further, image forming apparatus 1 includes extended application 400 arranged on extended application platform 300, and standard application management part 500 (standard application control circuit). When control part 10 executes the control program in the present disclosure, standard application executing part 100, apparatus control platform 200, and extended application platform 300 are realized on the circuit of control part 10. Further, based on a control configuration as shown in FIG. 2, control part 10 can execute extended application 400, standard application 120, and versatile OS 230.

Standard application executing part 100 is a circuit that executes standard application 120, which uses the hardware resources managed on apparatus control platform 200. Standard application executing part 100 has standard application 120 installed on apparatus control platform 200 and standard application service I/F part 110 corresponding to the standard application 120. The details of standard application executing part 100 are described later.

Apparatus control platform 200 is a circuit that manages the hardware resources of a whole image forming apparatus 1 on versatile OS 230 (Operating System) and controls each part by a functional processing module. Apparatus control platforms 200 includes a program and data. Apparatus control platform 200 includes API (Application Programming Interface) middleware, run time software, a linker, or the like, (henceforth, "API, or the like,") which serves as an executing framework of standard application 120, service or daemon on versatile OS 230, (henceforth "service, or the like,") and interpreter, JIT (Just In Time compiler), a virtual machine, or the like, (henceforth a "virtual machine, or the like,") which perform translation and execution of a script language or intermediate language. Also, extended application platform 300 itself is also operated on versatile OS 230. The details of apparatus control platform 200 are described later.

Extended application platform 300 is a circuit that calls standard application 120 and uses a function of it. Also, extended application platform 300 calls apparatus control platform 200 and uses hardware resources. Also, extended application platform 300 manages and executes extended application 400. Extended application platform 300 is a program and data including API, or the like, service, or the like, and a virtual machine, or the like, which serves as a executing framework of extended application 400. Also, extended application platform 300 itself is operated on versatile OS 230.

Extended application platform 300 includes standard function service 310, extended function service 320, OS installation service 330 (operating system installation service), and extended application management part 340.

Standard function service 310 is a service, or the like, which makes extended application 400 use the function of standard application 120 corresponded to standard application service I/F part 110. Extended function service 320 is a service, or the like, which makes extended application 400 use the hardware resources corresponding to platform service I/F part 210. Extended application management part 340 manages and executes extended application 400, which can call standard function service 310 and extended function service 320.

OS installation service 330 is a service, or the like, for adding a function to versatile-OS 230. OS installation service 330 installs a control program, such as a device driver and a script, on versatile OS 230. Also, OS installation service 330 performs installation of copy application execution service 121, printer application execution service 122, FAX application execution service 123, and various standard application execution service 124, or the like, which is new or is added a function.

Extended application 400 is the program and data of the application that performs various processing on extended application platform 300.

Extended application 400 is the program and data of the application, which is executed on extended application platform 300. Extended application 400 calls standard function service 310 and uses the function of standard application 120. Also, extended application 400 calls extended function service 320 and uses the function of each part of image forming apparatus 1. Also, extended application 400 calls OS installation service 330 and installs the adding function to versatile OS 230. Extended application 400 can execute these processes. Therefore, it becomes possible to make extended application 400 perform various processing, which cannot be used in image forming apparatus 1 itself.

Standard application management part 500 manages an existence and a state of the standard application. Standard application management part 500 also manages a state of a newly added standard application when the new standard application is added to a system. Standard application management part 500 receives the call from standard application 120 and transmits it to platform service I/F part 210. Thereby, standard application management part 500 executes the respective function of the respective part.

Then, the details of standard application executing part 100 are explained. Standard application executing part 100 includes standard application 120 and standard application service I/F part 110 (standard application service interface part).

Standard application 120 is the program and data of the application that performs various processing on apparatus control platform 200. Standard application 120 acquires the user instruction and uses the various function of the image forming apparatus with the user instruction. Also, for example, standard application 120 may be an application of intermediate language, such as Java (registered trademark) or may be written in various script languages, or the like.

Standard applications 120 are, for example, copy application execution service 121, printer application execution service 122, FAX application execution service 123, and various standard application execution service 124, or the like. These may already be installed in a state of factory shipments. Copy application execution service 121 acquires an instruction of copy in operation panel part 16 by a user. Then, copy application execution service 121 reads a manuscript in manuscript reading part 12. Copy application execution service 121 performs image formation for it by image formation part 17. Printer application execution service 122 renders files, such as PDL (Page Description Language) received by network transmitting and receiving part 15 with instructions from an external terminal, or the like. Printer application execution service 122 performs image formation for it by image formation part 17. Also, printer application execution service 122 may render the file in the document box of memory part 19, or the like, with instructions by the user in operation panel part 16. Printer application execution service 122 may perform image formation for it by image formation part 17. FAX application execution service 123 acquires an instruction of the facsimile transmission by the user in operation panel part 16. Then, FAX application execution service 123 reads a manuscript in manuscript reading part 12. FAX application execution service 123 performs facsimile transmission for it by Fax transmitting and receiving part 18. Also, FAX application execution service 123 may render the file, or the like, received from the external terminal and may transmit it by Fax transmitting and receiving part 18. Also, FAX application execution service 123 performs image formation for the image data, which is facsimile-received by Fax transmitting and receiving part 18, by image formation part 17. Also, FAX application execution service 123 may memorize the image data, which is the received facsimile, in the document box of memory part 19.

As for copy application execution service 121, printer application execution service 122, FAX application execution service 123, and various standard application execution service 124, or the like, a function may be added according to a user request. That is, for example, copy application execution service 121 adds function for adding a manuscript and reading two or more sheets of the manuscript, and copying them. Also, for example, printer application execution service 122 adds function for transmitting the image data performed image formation by image formation part 17 to a file management server via network transmitting and receiving part 15. Also, for example, FAX application execution service 123 adds function for transmitting the image data of the manuscript read by manuscript reading part 12 as like the above to the file management server via network transmitting and receiving part 15. Also, for example, various standard application execution service 124 adds function for printing the transmitted manuscript as a duplicate.

Also, the addition of each function is realized by installing copy application execution service 121, printer application execution service 122, FAX application execution service 123, various standard application execution service 124, or the like, which the function is added, respectively. In this case, the content of existing copy application execution service 121, printer application execution service 122, FAX application execution service 123, and the various standard application execution service 124, or the like, is updated. That is, it is updated to the content of copy application execution service 121, printer application execution service 122, FAX application execution service 123, the various standard application execution service 124, or the like, which is new and is added the respective function. In addition, for example, installation of copy application execution service 121, printer application execution service 122, FAX application execution service 123, and various standard application execution service 124, or the like, which is new and is added the respective function, may be carried out by OS installation service 330, which is aftermentioned. Also, it may provide an installation service only for installation in standard application management part 500, separately.

Also, the interface for using function from existing copy application execution service 121, printer application execution service 122, FAX application execution service 123, various standard application execution service 124, or the like, is managed by standard application management part 500. Also, the interface for using hardware resources is managed by standard application management part 500. The interface is used by copy application execution service 121, printer application execution service 122, FAX application execution service 123, various standard application execution service 124, or the like, which the contents are updated. The contents are updated by new copy application execution service 121, printer application execution service 122, FAX application execution service 123, various standard application execution service 124, or the like, which is added the function as mentioned above. Then, either of copy application execution services 121, printer application execution service 122, FAX application execution service 123, and various standard application execution service 124, or the like, are executed. At this time, from standard application management part 500 to apparatus control execution service 250, the interface for using the function from a corresponding application is provided. Thereby, apparatus control platform 200 can call and execute image processing service 221, device operation service 222, and network communication service 223, which are in after-mentioned each part control service 220. In this case, apparatus control platform 200 can be executed based on the interface from standard application management part 500.

Standard application service I/F part 110 provides the interface for using the function of standard application 120 from outside of standard application executing part 100. Standard application service I/F part 110 may be provided, for example, as a class of Java, an interface of Java language, a routine, a function, a header file, an object, a library, or the like. Also, standard application service I/F part 110 may be provided as a service on versatile OS 230, or the like. Also, standard application service I/F part 110 may provide a different interface for each standard application 120. Also, standard application service I/F part 110 can also perform execution, installation, change of a setup, deletion, or the like, for standard application 120.

Then, the details of apparatus control platform 200 are explained. Apparatus control platform 200 includes platform service I/F part 210 (platform service interface part), each part control service 220, versatile OS 230, apparatus control management service 240, and apparatus control execution service 250.

Platform service I/F part 210 provides the interface for using hardware resources from outside of apparatus control platform 200. Platform service I/F part 210 calls each part control service 220 and makes use the hardware resources of each part in image forming apparatus 1. Platform service I/F part 210 may be provided, for example, as service on versatile OS 230, such as API, or the like. Also, platform service I/F part 210 may be provided as a structure of C language, a class of C++ language, other objects, a routine, a function, a header file, an object, a library, or the like (henceforth a "class, or the like.")

Also, platform service I/F part 210 may be provided, for example, in intermediate language, such as Java.

Each part control service 220 is service, or the like, which control each part corresponding to the function in image forming apparatus 1 by using a suitable method. Each part control service 220 operates, for example, image processing part 11, operation panel part 16, and network transmitting and receiving part 15, or the like, corresponding to the call from platform service I/F part 210. Also, each part control service 220 can call a copy function, a network scanning function, a document box function, or the like. Also, each part control service 220 may be included in firmware with a combination of different service, or the like, API, or the like, and class, or the like according to the product line.

Each part control service 220 includes image processing service 221, device operation service 222, and network communication service 223.

Image processing service 221 provides the service about generation, conversion, and output for the data of image processing. Image processing service 221, for example, makes memory part 19 memorize the image data, which is set up resolution, a color, or the like, and is read the manuscript by manuscript reading part 12. Also, image processing service 221, for example, performs image processing of the image data and document data in memory part 19 to image processing part 11. Also, image processing service 221 renders the image data, which is performed image formation by image formation part 17, from a file, or the like.

Device operation service 222 provides the service for controlling the device of each part, or the like. Device operation service 222, for example, memorizes the image data acquired from manuscript reading part 12 to memory part 19. Also, device operation service 222, for example, renders an image on a browser displayed on the display part of operation panel part 16, transmits the rendered image data to image formation part 17, and performs image formation. Also, device operation service 222, for example, performs facsimile transmission the image data, which is memorized in memory part 19, by Fax transmitting and receiving part 18. Also, device operation service 222, when option equipment is present in image forming apparatus 1, can call each function. Device operation service 222, for example, when a finisher is present, bookbinding, a staple, or the like, can be performed; when a user authentication part with an IC card or biometrics is present, user authentication by the user authentication part can be performed; and when a camera is present, acquisition a camera image, line of sight detection, or the like, can be performed. Also, device operation service 222, for example, may control closer to the hardware configuration in the apparatus, such as driving one of the motors in the conveyance part. Also, device operation service 222 may perform a process of acquisition for a state of each part, or the like.

Network communication service 223 provides the service about network transmission and reception, or the like, from network transmitting and receiving part 15 (as shown in FIG. 1)

Network communication service 223, for example, transmits and receives the file, or the like, among another image forming apparatuses, servers, a terminal, or the like, by using various protocols, such as TCP/IP or UDP. For example, network communication service 223 can also transmit and receive the scanned image data, the file in the document box, or the like. Network communication service 223 can also transmit and receive the image data of the facsimile transmission and reception by Fax transmitting and receiving part 18. Also, network communication service 223 can transmit and receive user authentication result, when the user authentication part is present. Also, network communication service 223 can perform transmission and reception of video image data, or the like, when the camera is present. Also, network communication service 223 can transmit and receive about the state of each part in image forming apparatus 1 and the result of the call for the function of each part.

Versatile OS 230 controls each part of image forming apparatus 1. As versatile OS 230, for example, versatile OSs such as Linux (registered trademark), OS for embedded use, real-time OS, or the like, can be used. Also, program, data, or the like, which performs schedule management and manages basic hardware, such as a kernel, or a core, in versatile OS 230 may be included in the firmware. Also, versatile OS 230 can add control programs, such as a device driver and a script, separately. The device driver may be made in a language, which considers performance as important, such as C language, C++ language, assembler language, or the like.

Apparatus control management service 240, when copy application execution service 121, printer application execution service 122, FAX application execution service 123, or various standard application execution service 124, or the like, as mentioned above, are executed, and the request accompanying this is advanced from executed copy application execution service 121, printer application execution service 122, FAX application execution service 123, or various standard application execution service 124, or the like, requires the interface of the corresponding application to standard application management part 500 as mentioned above.

Apparatus control execution service 250 calls and executes image processing service 221, device operation service 222, and network communication service 223 in each part control service 220 based on the interface received from standard application management part 500.

In addition, each part shown in FIG. 2 can be realized by reading the control program memorized in HDD, a flash memory, or the like, to RAM, or the like, in memory part 19, and by executing in control part 10. Also, each part shown in FIG. 2 can access each part shown in FIG. 1, which is the hardware resources, and it can control and perform reading and writing of various data, transmission and reception, or the like.

[Image Processing by Image Forming Apparatus 1] Then, it is explained the executing procedure of the standard application added the function without changing the function in the side of extended application platform 300 and apparatus control platform 200. In the following, for example, the case below is explained. The function is added to existing copy application execution service 121, and it is updated by the content of new copy application execution service 121. The interface of the updated function is managed by standard application management part 500. Also, as for this example, in new copy application execution service 121, the function that transmits the copied manuscript by FAX after copying the manuscript (henceforth "copy FAX transmission") is added. Also, when new copy application execution service 121 is installed in standard application 120, an item of "copy FAX transmission" is displayed on the operation menu screen in operation panel part 16. Hereinafter, the executing procedure in the copy FAX transmission as shown in FIG. 3 is explained in order of a step.

(Step S101)

Firstly, as shown in FIG. 3, a user sets a manuscript and performs a copy setup. At this time, the item of the "copy FAX transmission" displayed on the operation menu screen in operation panel part 16 is selected. Then, copy information and FAX information are setup. Copy information is information, such as copy manuscript size, copy size, a number of copies, copy density, a single-sided copy, and a double-sided copy. FAX information is information, such as a FAX address, transmitting image density, and transmitting image size. Then, the start button of operation panel part 16 is pressed.

(Step S102)

Next, the item of "copy FAX transmission" is selected, copy information and FAX information are set up, and when a start button is pressed after that, standard application management part 500 starts copy application execution service 121.

(Step S103)

Next, when copy application execution service 121 is started, the utilization request of hardware resources is output from copy application execution service 121 to the apparatus control platform 200 side.

(Step S104)

At this time, apparatus control management service 240 in apparatus control platform 200 requires the interface to standard application management part 500 in extended application platform 300. This is the interface for using the function provided by copy application execution service 121.

(Step S105)

Standard application management part 500 accepts the interface request from apparatus control management service 240. Standard application management part 500 outputs the interface for using the function provided by copy application execution service 121 to apparatus control execution service 250. Here, the interface output from standard application management part 500 indicates the process of copying the manuscript and transmitting the copied manuscript by FAX after that.

(Step S106)

Also, apparatus control management service 240 instructs the call of each part control service 220 to apparatus control execution service 250.

(Step S107)

Thereby, apparatus control execution service 250 calls and executes image processing service 221 and device operation service 222. At this time, reading (scan) of the manuscript by manuscript reading part 12 is started by the service in connection with the control provided by device operation service 222. The image data read here, for example, is memorized in the document box of memory part 19 as mentioned above. This is executed by the service in connection with the control provided from device operation service 222. Also, by using the service in connection with the control provided by image processing service 221, image formation part 17 performs image formation of the image data memorized in the document box of memory part 19. Thereby, printing to a recording paper is performed (completion of copy processing.) After printing is completed, by using the service in connection with the control provided by device operation service 222, facsimile transmission by Fax transmitting and receiving part 18 is performed. Here, Fax transmitting and receiving part 18 renders the image data memorized in the document box of memory part 19 as mentioned above and performs facsimile transmission. In addition, as for network communication service 223, the call is not performed here. This is because there is no transmission via the external network.

As above-mentioned, standard application management part 500 manages the interface that indicates the process of copying the manuscript by copy application execution service 121 and transmitting the copied manuscript by FAX after that. Also, apparatus control management service 240 in apparatus control platform 200 requires the interface to standard application management part 500. Apparatus control execution service 250 inputs the interface from standard application management part 500. Further, apparatus control management service 240 instructs the call of each part control service 220 to apparatus control execution service 250. Thereby, copy application execution service 121 can perform copy of the manuscript and FAX transmission of the copied image. That is, the platform of image forming apparatus 1 is separated into extended application platform 300, apparatus control platform 200, and standard application management part 500. Also, it enables to execute mutual processing, independently. Thereby, even if an addition and a deletion of a function are carried out to the application execution service of standard application 120, it enables not changing in the side of extended application platform 300 and apparatus control platform 200.

As explained in detail, in a typical image forming apparatus, when an application is added or deleted, an application management module arranged on the platform intervening between application and hardware resources must be changed. If the application management module is changed, the hardware resources are also affected. Therefore, modification is required both for the application and the hardware resources.

As compared with this, according to the image forming apparatus, image forming method, and image forming program in the present disclosure, the dependency between application and hardware is reduced. Thereby, the alteration work in an addition or a deletion for an application is reducible.

In addition, the present embodiment explains a case for applying to an image forming apparatus in the present disclosure. However, it is applicable not only to this example but a variety-of-information processing apparatus. That is, it may be a configuration that a network scanner, a server for connecting the scanner, separately, by USB, or the like, is used. Also, it is applicable to PC, a smart phone, a mobile phone, office equipment, industrial equipment, or the like, which is information processing equipment having ability to install an application.

In this way, the image forming apparatus, image forming method, and image forming program of the present disclosure reduce the dependency of the application and the hardware. Therefore, the alteration work in an addition or a deletion for an application is reducible.

In the above, the present disclosure is explained by the detailed embodiment. However, the above-mentioned embodiment is exemplification of the present disclosure, and it is overemphasized that it is not limited to this embodiment.

Also, as industrial applicability, an image forming apparatus of the present disclosure, an image forming method, and a recording medium are applicable to all apparatus, a method, and a recording medium, providing with extended function service.

What is claimed is:

1. An image forming apparatus comprising a control circuit, wherein the control circuit includes:
  a standard application execution circuit that has a standard application execution service for executing a standard application;
  a control service that controls hardware on an operating system;
  an apparatus control execution service that executes the control service with an interface as an executing procedure of the control service;
  an apparatus control platform that has an apparatus control management service for instructing a call of the control service to the apparatus control execution service; and
  a standard application control circuit that provides an interface for managing a state of the standard application and for using a function of the standard application execution service, wherein when the function of the standard application execution service is updated by an installation service, the standard application control circuit provides the interface for managing the state of the standard application, and the interface for managing the state of the standard application shows an operation procedure for using the updated function of the standard application execution service,
  wherein
    when the standard application execution service outputs a request for using hardware resources to the apparatus control platform,
    the apparatus control management service outputs a request for using the function of the standard application execution service to the standard application control circuit,
    the standard application control circuit outputs the interface for using the function of the standard application execution service to the apparatus control execution service, and
    the apparatus control management service instructs the call of the control service to the apparatus control execution service, wherein the apparatus control execution service calls the control service based on the interface as an executing procedure, and the control service is called by the apparatus control execution service to control a hardware corresponding to the function.

2. The image forming apparatus of claim 1, further comprising the installation service, wherein the installation service installs the updated function of the standard application execution service, and controls the interface for managing the state of the standard application corresponding to the updated function.

3. An image forming method executed by an image forming apparatus having hardware resources, comprising:

executing, via a standard application execution service provided by a standard application execution circuit, a standard application;

controlling, via a control service provided by a control circuit, hardware on an operating system;

executing, via an apparatus control execution service provided by the control circuit, the control service with an interface as an executing procedure of the control service;

instructing, via an apparatus control management service provided by an apparatus control platform in the control circuit, a call of the control service to the apparatus control execution service;

when the function of the standard application execution service is updated by an installation service, providing, via a standard application control circuit, an interface for managing a state of the standard application and for using a function of the standard application execution service, wherein the interface for managing the state of the standard application shows an operation procedure for using the updated function of the standard application execution service; and when outputting, via the standard application execution service, a request for using the hardware resources to the apparatus control platform, outputting, via the apparatus control management service, a request for using the function of the standard application execution service to the standard application control circuit;

outputting, via the standard application control circuit, the interface for using the hardware resources to the apparatus control execution service; and instructing, via the apparatus control management service, the call of the control service step to the apparatus control execution service, wherein the apparatus control execution service calls the control service based on the interface as an executing procedure, and the control service is called by the apparatus control execution service to control a hardware corresponding to the function.

4. The image forming method of claim 3, wherein the updated function of the standard application execution service is installed via the installation service, and the method comprises controlling, via the installation service, the interface for managing the state of the standard application corresponding to the updated function.

5. A non-transitory computer readable recording medium storing a control program executable by a computer for controlling an image forming apparatus, the control program comprising:

a first program code causing the computer to execute a standard application;

a second program code causing the computer to control hardware on an operating system;

a third program code causing the computer to execute the second program code with an interface as an executing procedure of the second program code;

a fourth program code causing the computer to instruct a call of the second program code to the third program code; and a fifth program code causing the computer to provide an interface for managing a state of the standard application and for using a function of the first program code, wherein the interface for managing the state of the standard application is provided when the first program code is updated by an installation service, and shows an operation procedure for using the updated function of the first program, wherein when the first program code causes the computer to output a request for using hardware resources to an apparatus control platform, the fourth program code causes the computer to output the request that uses the function of the first program code for the fifth program code, the fifth program code causes the computer to output the interface for using the hardware resources to the third program code, and the fourth program code causes the computer to execute an instruction for calling the second program code to the third program code, wherein the third program code calls the second program code based on the interface as an execution procedure, and the second program code is called by the third program code to control a hardware corresponding to the function.

6. The non-transitory computer readable recording medium of claim 5, further comprising the installation service, wherein the installation service installs the updated function of the fifth program code, and controls the interface for managing the state of the standard application corresponding to the updated function.

* * * * *